United States Patent
Moore et al.

(10) Patent No.: US 11,866,084 B2
(45) Date of Patent: Jan. 9, 2024

(54) MOBILITY DEVICE WITH CARGO BIN STACK

(71) Applicant: Toyota Motor North America, Inc., Plano, TX (US)

(72) Inventors: Douglas A. Moore, Fairview, TX (US); Paul Nichols, Healdsburg, CA (US); Thomas Mitchell Dair, Lafayette, CA (US)

(73) Assignee: Toyota Motor North America, Inc., Plano, TX (US)

(*) Notice: Subject to any disclaimer, the term of this patent is extended or adjusted under 35 U.S.C. 154(b) by 609 days.

(21) Appl. No.: 17/091,677

(22) Filed: Nov. 6, 2020

(65) Prior Publication Data
US 2022/0144328 A1   May 12, 2022

(51) Int. Cl.
*B62B 3/14* (2006.01)
*B62B 3/02* (2006.01)
*B62B 5/00* (2006.01)

(52) U.S. Cl.
CPC .......... *B62B 3/146* (2013.01); *B62B 3/02* (2013.01); *B62B 3/1424* (2013.01); *B62B 3/1432* (2013.01); *B62B 3/1476* (2013.01); *B62B 5/004* (2013.01); *B62B 5/0059* (2013.01); *B62B 5/0096* (2013.01)

(58) Field of Classification Search
CPC ......... B62B 3/146; B62B 3/1476; B62B 3/02; B62B 3/1424; B62B 3/1432
See application file for complete search history.

(56) References Cited

U.S. PATENT DOCUMENTS

| | | | | |
|---|---|---|---|---|
| 3,107,105 A | * | 10/1963 | Heriford | A61G 5/026 280/211 |
| 3,314,494 A | | 4/1967 | Weitzner | |
| 3,602,730 A | * | 8/1971 | Cushing | B63B 25/004 290/1 R |
| 5,411,044 A | * | 5/1995 | Andolfi | A61G 7/1019 414/921 |

(Continued)

FOREIGN PATENT DOCUMENTS

| CN | 202446376 U | 9/2012 |
|---|---|---|
| CN | 206187208 U | 5/2017 |

(Continued)

OTHER PUBLICATIONS

"Empathik Mobility Aid for Seniors Doubles as a Shopping Trolley"; 12 pages; http://www.tuvie.com/empathik-mobility-aid-for-seniors-doublesas-a-shopping-trolley/.

*Primary Examiner* — Derek J Battisti
(74) *Attorney, Agent, or Firm* — Dinsmore & Shohl LLP

(57) ABSTRACT

Embodiments herein are directed to a mobility device. The mobility device includes a frame, a pair of foot plates, and a base. The frame has a pair of side rails. The pair of foot plates are pivotally attached to the pair of side rails. Each of the pair of foot plates have a transport surface. The base has an upper surface and an opposite lower surface. The lower surface of the base includes at least one receiving cavity that corresponds to a shape of the pair of foot plates. The base is positioned on the transport surface to receive the pair of foot plates within the at least one receiving cavity and is configured to receive a plurality of cargo containers on the upper surface.

20 Claims, 12 Drawing Sheets

(56) References Cited

U.S. PATENT DOCUMENTS

| | | | | |
|---|---|---|---|---|
| 5,568,933 | A * | 10/1996 | Mizuno | A61G 5/0816 |
| | | | | 280/42 |
| 5,894,898 | A | 4/1999 | Catto | |
| 6,378,883 | B1 * | 4/2002 | Epstein | A61H 3/04 |
| | | | | 180/65.6 |
| 6,866,288 | B2 | 3/2005 | Martin | |
| 7,128,332 | B2 * | 10/2006 | Hermes | A61G 5/128 |
| | | | | 280/642 |
| 7,921,953 | B2 * | 4/2011 | Irvine | A61H 3/04 |
| | | | | 297/423.12 |
| 9,422,022 | B2 | 8/2016 | Sharkan et al. | |
| 9,829,032 | B2 * | 11/2017 | Hermes | A61G 5/1062 |
| 9,854,203 | B2 | 12/2017 | Benetti et al. | |
| 10,016,324 | B1 * | 7/2018 | Howard | A61H 3/00 |
| 2004/0056442 | A1 | 3/2004 | Ostrowski et al. | |
| 2010/0264728 | A1 * | 10/2010 | Rickrode | B60R 25/10 |
| | | | | 340/426.1 |
| 2016/0330402 | A1 * | 11/2016 | Benetti | A61H 3/04 |
| 2017/0313334 | A1 * | 11/2017 | Ryan | B62B 3/025 |

FOREIGN PATENT DOCUMENTS

| | | |
|---|---|---|
| DE | 19619078 A1 | 11/1997 |
| KR | 200383669 Y1 | 5/2005 |
| WO | 2015059662 A1 | 4/2015 |

\* cited by examiner

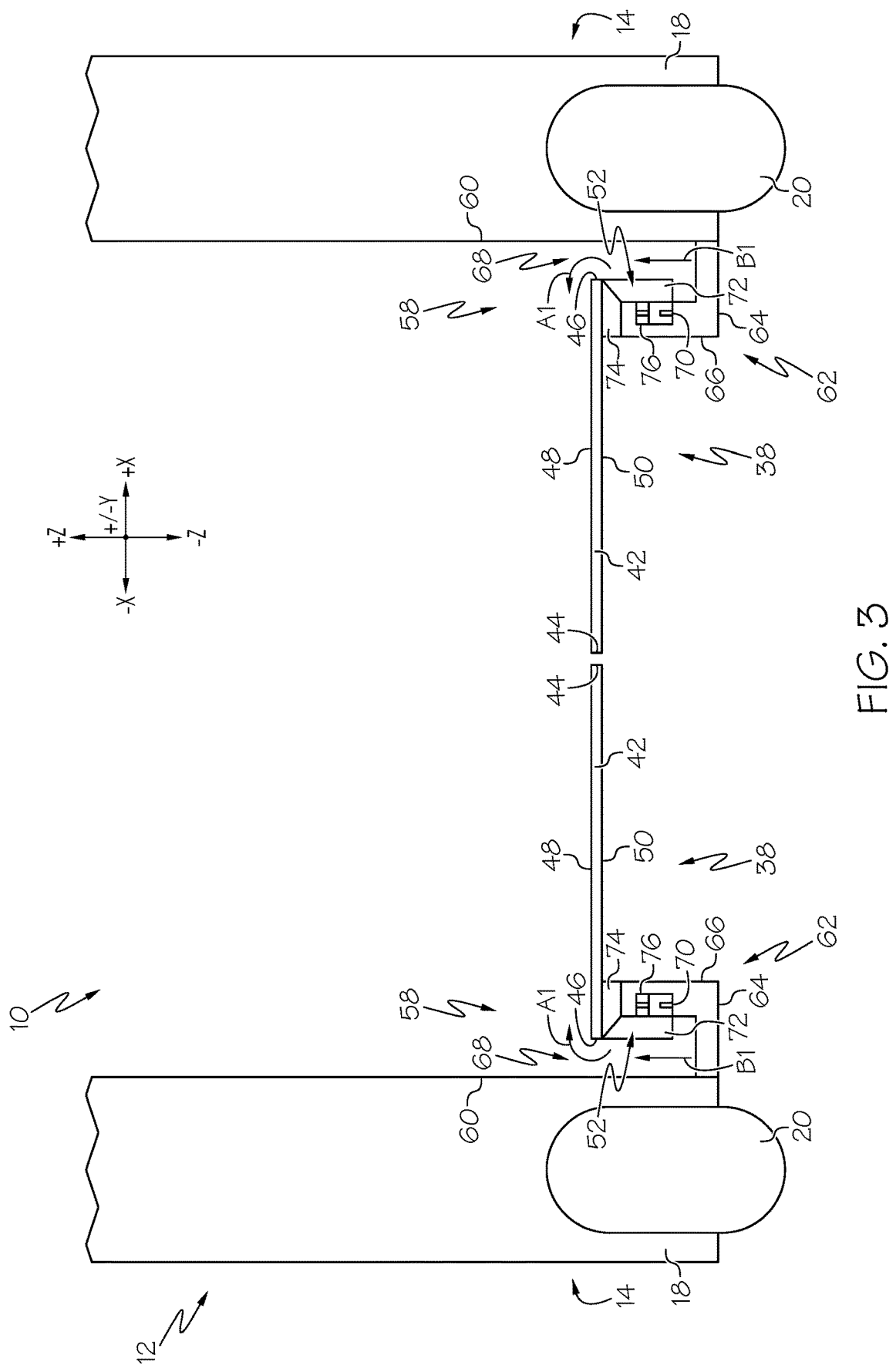

MOBILITY DEVICE WITH CARGO BIN STACK

TECHNICAL FIELD

The present specification generally relates to mobility devices for transporting cargo and, more specifically, mobility devices having transitional to a cargo transport mode to transport interlocking cargo containers with displays.

BACKGROUND

Persons in need of physical assistance require mobility devices to perform everyday tasks, such as moving items or cargo from one place to another. To perform these tasks, a caregiver and/or different assistive mobility devices are required. For example, a person may use a cart to drag these items around. However, such devices may be manually operated and/or powered. When manually operated, the device is operated under a user's own force. As such, this is difficult persons in need of physical assistance to move around.

SUMMARY

In one embodiment, a mobility device is provided. The mobility device includes a frame, a pair of foot plates, and a base. The frame has a pair of side rails. The pair of foot plates are pivotally attached to the pair of side rails. Each of the pair of foot plates have a transport surface. The base has an upper surface and an opposite lower surface. The lower surface of the base includes at least one receiving cavity that corresponds to a shape of the pair of foot plates. The base is positioned on the transport surface to receive the pair of foot plates within the at least one receiving cavity and is configured to receive a plurality of cargo containers on the upper surface.

In another embodiment, a cargo transporting system is provided. The cargo transporting system includes a plurality of cargo containers and a multi-function mobility device. The multi-function mobility device includes a frame and a base. The frame includes a pair of side rails and a pair of foot plates attached to the pair of side rails. Each of the pair of foot plates have a transport surface. The base has an upper surface and an opposite lower surface. The lower surface of the base includes at least one receiving cavity that corresponds to a shape of the pair of foot plates. The transport surface of the pair of foot plates is received in the at least one receiving cavity of the base. The upper surface of the base is configured to support the plurality of cargo containers.

In yet another embodiment, a cargo transporting system is provided. The cargo transporting system includes a plurality of cargo containers and a multi-function mobility device. The plurality of cargo containers include an upper surface, an opposite lower surface, a display and a cargo transport interlocking system. The display is configured to provide information regarding an item inside at least one cargo container of the plurality of cargo containers. The cargo transport interlocking system includes a plurality of receiving portions positioned within the upper surface of each of the plurality of cargo containers and a plurality of corresponding elongated members that extend from a lower surface of each of the plurality of cargo containers. The multi-function mobility device includes a frame and a base. The frame includes a pair of side rails and a pair of foot plates attached to the pair of side rails. The base has an upper surface and an opposite lower surface. The lower surface is in contact with the pair of foot plates and the upper surface of the base includes the plurality of receiving portions. Each one of the plurality of corresponding elongated members are received in the corresponding plurality of receiving portions to interlock each of the plurality of cargo containers to vertically interlock the plurality of cargo containers from the base.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a partial rear view of the mobility device with the pair of foot plates in the unfolded position, according to one or more embodiments shown and described herein;

DETAILED DESCRIPTION

Embodiments described herein are directed to powered mobility devices that include foot plates pivotally attached to a frame and transitional between an unfolded position for supporting cargo thereon, and a folded position for allowing a user to walk between the frame of the mobility device and to be used as a walker. The mobility device is positionable into a cargo transport mode, which allows the foot plates to support a plurality of interlocking containers as a stack when the foot plates are in the unfolded position. The cargo transport mode provides the ability to securely transport desired items, while allowing information about such items to be shown on a display of a cargo container transported by the cargo transport mode. A base is positioned between the foot plates and the plurality of containers. The base includes an upper surface and opposite lower surface. The lower surface has a pair of receiving channels that compliment a length and a width of the foot plates such that, in the unfolded position, the foot plates are received into the receiving channel. The base may be a battery such that the upper surface of the base communicatively couples with each of the containers in a series configuration to provide the necessary power to each of the plurality of containers. As such, information about items housed within each container may be shown on a display of the cargo container.

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a nonconductive medium, and the like.

Figure 1:
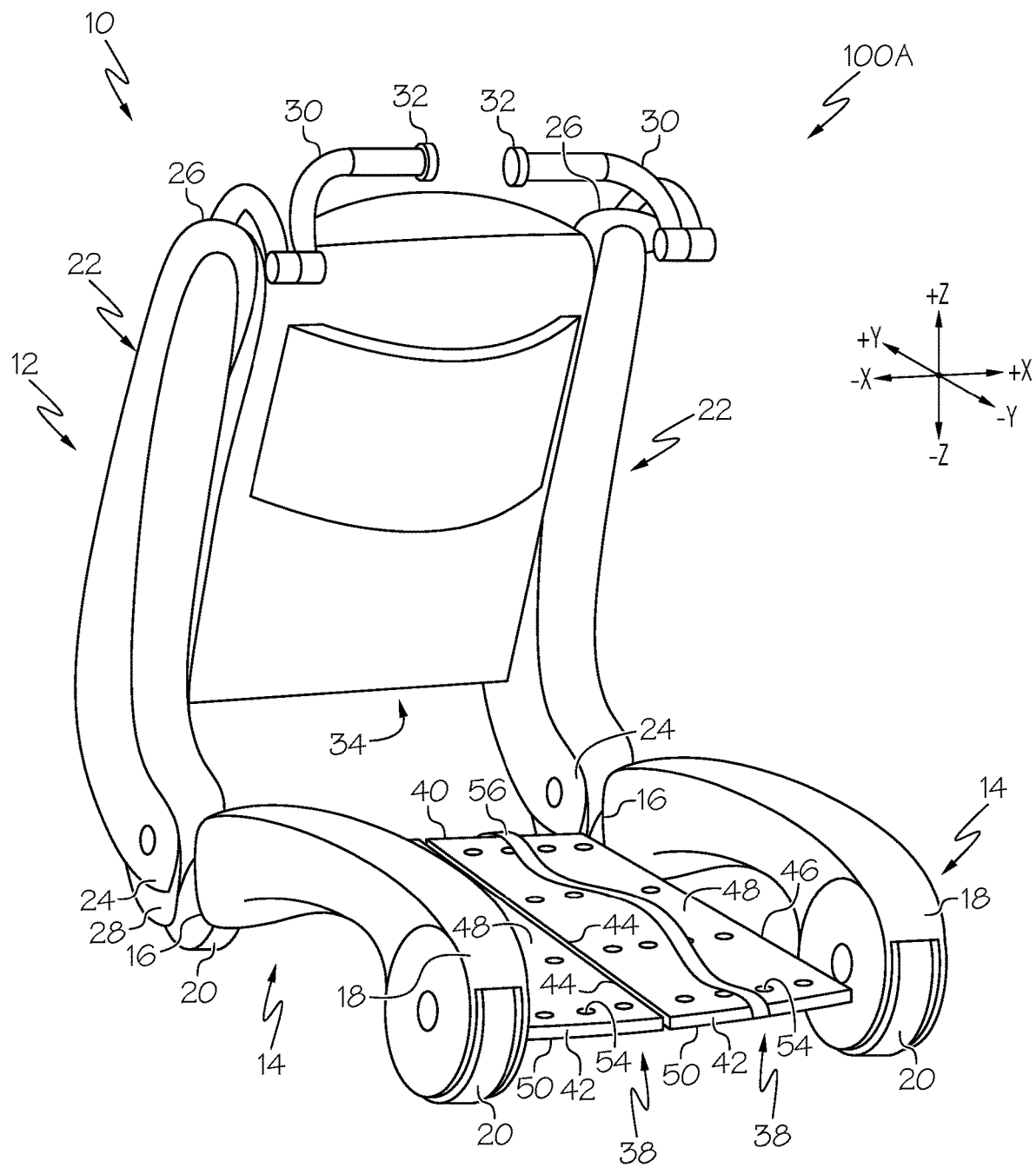
FIG. 1 schematically depicts a mobility device in a cargo transport position with a pair of foot plates in an unfolded position, according to one or more embodiments shown and described herein.

As used herein, the term "longitudinal direction" refers to the forward-rearward direction of the mobility device (i.e., in the +/−Y direction of the coordinate axes depicted in FIG. 1). The term "lateral direction" refers to the cross direction (i.e., in the +/−X direction of the coordinate axes depicted in FIG. 1), and is transverse to the longitudinal direction. The term "vertical direction" refers to the upward-downward direction of the mobility device (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Various embodiments of the mobility devices and the operation of the mobility devices are described in more detail herein. Whenever possible, the same reference numerals will be used throughout the drawings to refer to the same or like parts.

Figure 2:
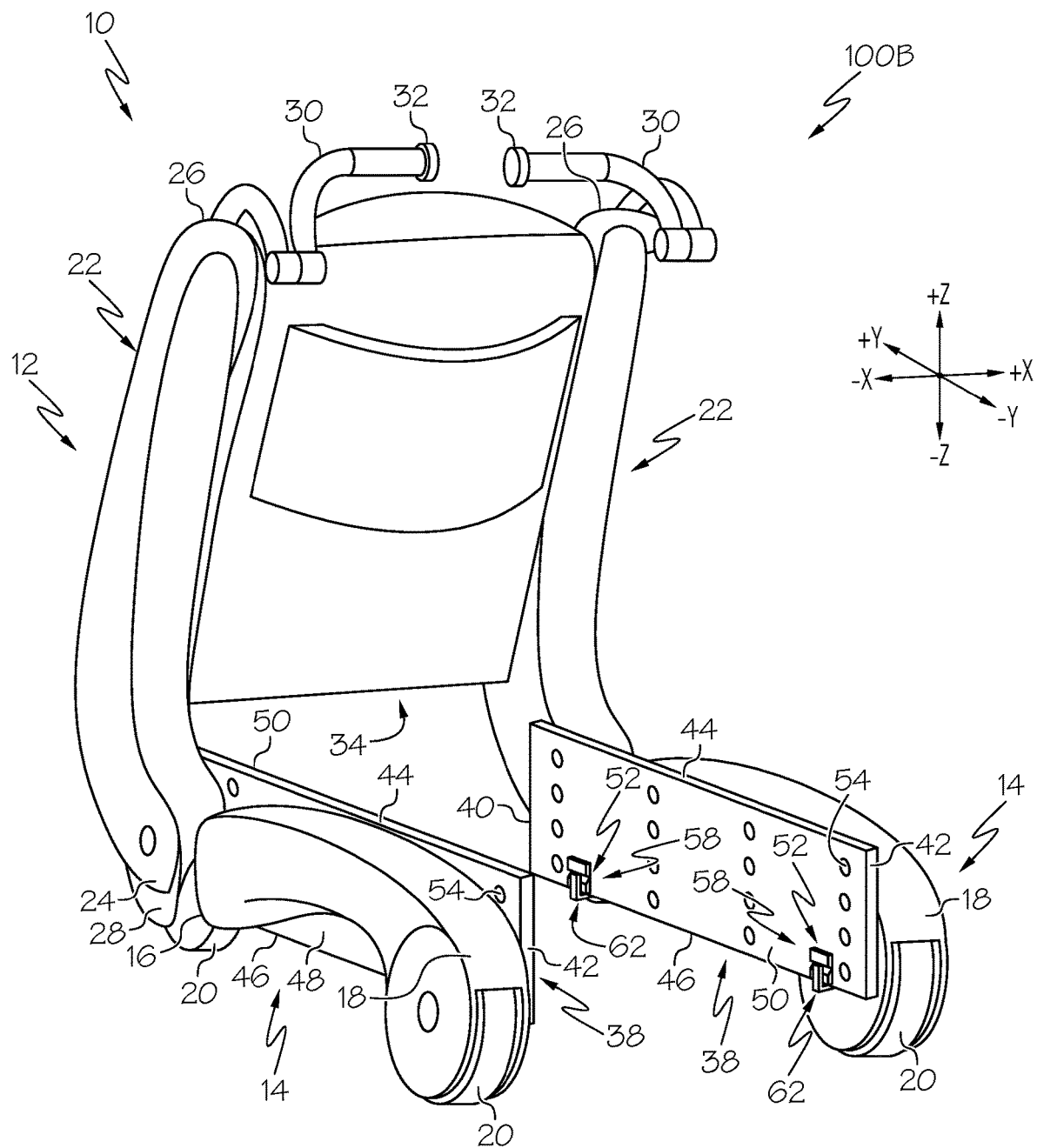
FIG. 2 schematically depicts the mobility device in a walker position with the pair of foot plates in a folded position, according to one or more embodiments shown and described herein.

Referring now to FIGS. 1-3, a mobility device 10 is illustrated according to one or more embodiments described herein. The mobility device 10 is positionable in at least a transport position (FIG. 1), to be used as an example cargo transport device in an example cargo transport mode 100A (i.e., where the example cargo transport device transports cargo such as bins or users) and/or as an example walker device in a walker mode 100B (FIG. 2) (i.e., where the example walker device is used for stabilization of the user). It should be appreciated that the mobility device 10 may be positionable in other positions, not discussed herein, such as, for example, a storage position. Further, it should be appreciated that the mobility device 10 may be powered, (i.e., at least partially self-propelled), by a power source such as, for example, a battery or solar-powered. The power source may facilitate operation of the mobility device 10 including transitioning between the different positions disclosed herein.

With reference to FIGS. 1-2, the mobility device 10 includes a frame 12 including at least one side rail 14. In embodiments, the mobility device 10 may include a pair of side rails 14 with each side rail 14 having a first end 16 and an opposite second end 18. Each side rail 14 may include a pair of wheels 20 with one wheel, i.e., front wheel, provided proximate the first end 16 and another wheel, i.e., rear wheel, provided proximate the second end 18 of the side rail 14. The wheels 20 of the mobility device 10 may be powered many any suitable gears and motors, not discussed in detail herein, for moving the mobility device 10 along a surface. The wheels 20 may also may be permitted to be manually operated when the mobility device 10 is pushed to reduce energy consumption.

The frame 12 further includes an arm 22 extending proximate the first end 16 of each side rail 14. Each arm 22 has a first end 24 and an opposite second end 26. In embodiments, the first end 24 of each arm 22 is rotatably attached to the first end 16 of a corresponding one of the side rails 14 and positionable between at least an upright position, as shown in FIGS. 1 and 2, and other positions, such as an intermediate position. In embodiments, the first end 24 of the arm 22 may be rotatably coupled to the first end 16 of the side rail 14 either directly or indirectly by a coupling member 28 allowing the arm 22 to rotate between the upright position and the intermediate position relative to the side rail 14.

Each arm 22 may include a handle portion 30, which may include at least one control member 32 for operating the mobility device 10 such as, for example, powering on or off the mobility device 10, controlling a speed and/or direction of the mobility device 10, and transitioning between operating positions of the mobility device 10. The control member 32 may include at least one switch, button, or the like for controlling the mobility device 10.

Still referring to FIGS. 1-2, the frame 12 of the mobility device 10 may include a seat member 34 provided between the pair of arms 22 and rotatable relative to the pair of arms 22. The seat member 34 may be positionable between at least a stowed position, as shown in FIGS. 1 and 2, and other positions, such as a use position where the seat is useable by the user. That is, when in the use position, the seat member 34 forms a seat having a seat surface extending horizontal for supporting the user when the mobility device 10.

The mobility device 10 further includes a pair of foot plates 38. Each foot plate 38 is coupled to a corresponding one of the pair of side rails 14 and rotatably attached thereto. Each foot plate 38 has a front end 40, an opposite rear end 42, a first or inner side 44, an opposite second or outer side 46, a first or transport surface 48, and an opposite second or lower surface 50. At least one hinge 52, described in more detail herein, may be provided for rotatably attaching each foot plate 38 to a corresponding side rail 14. As shown in FIG. 2, in embodiments, each foot plate 38 may include a pair of hinges 52, such as a front hinge and a rear hinge, for rotatably attaching the foot plate 38 to a corresponding side rail 14. As such, the foot plates 38 are operable between an unfolded or horizontal position, as shown in FIGS. 1 and 3, and a folded or upright position, as shown in FIG. 2. When the foot plates 38 are in the unfolded position, the transport surface 48 faces an upward direction and the lower surface 50 faces an opposite downward direction. When the foot plates 38 are in the folded position, the transport surface 48 faces a corresponding side rail 14 to which it is rotatably coupled and the lower surface 50 faces away from the corresponding side rail 14 and toward the opposite side rail 14.

In embodiments, a plurality of apertures 54 may be formed in each of the foot plates 38 extending through the transport surface 48 and the lower surface 50 of the foot plates 38 to allow fluid and debris to pass through the foot plates 38. This prevents fluid and debris from collecting on the transport surface 48 of the foot plates 38. In embodiments, as shown in FIG. 1, each foot plate 38 may include a restraint member 56 such as, for example, a strap, buckle, or the like for securing an object or cargo to the transport surface 48 of the foot plates 38. The restraint member 56 may be detachably connected to the foot plates 38, extend from any suitable location of the foot plates 38, and have an adjustable length. In other embodiments, the restraint member 56 may extend from the side rails 14 as opposed to the foot plates 38 themselves. In embodiments, each foot plate 38 includes a one-piece, monolithic structure extending from the front end 40, the rear end 42, the inner side 44, and the outer side 46.

When in the unfolded position, as best seen in FIGS. 1 and 3, the foot plates 38 are configured to support cargo being transported. Thus, in some embodiments, the foot plates 38 are configured to support at least 100 pounds. In other embodiments, when in the unfolded position, the foot plates 38 are configured to support at least 200 pounds. In other embodiments, when in the unfolded position, the foot plates 38 are configured to support at least 300 pounds.

As described in more detail herein, each foot plate 38 may be manually operated to position the foot plates 38 between the unfolded position and the folded position. However, in embodiments, the foot plates 38 may include any suitable powered mechanism such as, for example, a motor or actuator, for automatically positioning the foot plates 38 between the unfolded position and the folded position. When the foot plates 38 are powered, the foot plates 38 may be operated by utilizing the control member 32 on the handle portion 30 each arm 22.

Referring now to FIG. 3, a non-limiting example of a securing mechanism 58 for rotatably coupling the foot plates 38 to the side rails 14 and securing the foot plates 38 in the folded position is shown. It should be understood that the foot plates 38 may be rotatably coupled to the side rails 14 in a manner different from that illustrated by FIG. 3. As shown in FIG. 3, the foot plates 38 are in the unfolded position and extend across at least substantially the entire width of the mobility device 10. In embodiments, each side rail 14 includes an inner portion 60 and a bracket 62 fixed to the inner portion 60 and extending in an inwardly direction toward an opposite side rail 14. The bracket 62 may be an L-shape having a first leg 64 and a second leg 66 extending from an end of the first leg 64. Thus, a channel 68 may be provided between the second leg 66 of the bracket 62 and the inner portion 60 of the side rail 14 for receiving a corresponding foot plate 38 when in the folded position, as described in more detail herein. In embodiments, the second leg 66 of the bracket 62 has a first locking member 70 such as, for example, a hook, clasp, or the like. The hinge 52 has a first hinge segment 72 and a second hinge segment 74, pivotally attached to one another, and hingedly couples a foot plate 38 to a corresponding bracket 62. In embodiments, the first hinge segment 72 includes a second locking member 76 such as, for example, a hook, clasp, or the like for engaging the first locking member 70 when the foot plate 38 is rotated into the folded positioned. It should be appreciated that when the foot plate 38 is in the folded position, the foot plate 38 is positionable between an unlocked state in which the foot plate 38 is raised in the direction of arrow $B_1$ and the first locking member 70 does not engage the second locking member 76, and a locked state in which the foot plate 38 is lowered in the direction of arrow $B_2$ and the first locking member 70 engages the second locking member 76.

In embodiments, the foot plate 38 may be prohibited from being positioned in the unfolded position when the foot plate 38 is lowered into the channel 68 without the use of the first locking member 70 and the second locking member 76. Specifically, when the foot plate 38 is lowered into the channel 68, the hinge 52 may be prohibited from rotating against the second leg 66 of the bracket 62 and into the unfolded position based on a pivot point between the first hinge segment 72 and the second hinge segment 74 being below a top of the second leg 66 of the bracket 62. Lifting the hinge 52 in the direction of arrow $B_1$ allows the second hinge segment 74 to rotate in the direction of arrow Ai over the top of the second leg 66 of the bracket 62 and position the foot plate 38 in the unfolded position.

As discussed herein, the foot plates 38 may be manually operated or powered to be positioned between the unfolded position and the folded position. When manually operated, a user may lift each foot plate 38 in the direction of arrows $B_1$ and rotate the foot plates 38 in the direction of arrows Ai to position the foot plates 38 in the unfolded position. The first locking member 70 and the second locking member 76 may be automatically disengaged when the foot plate 38 is lifted or, in embodiments, may require manual disengagement prior to lifting the foot plate 38. Similarly, the foot plates 38 may be positioned back into the folded position by rotating the foot plates 38 and lowering the foot plates 38. The first locking member 70 and the second locking member 76 may automatically engage one another to lock the foot plates 38 in the folded position or, in embodiments, be manually engaged.

Figure 4A:
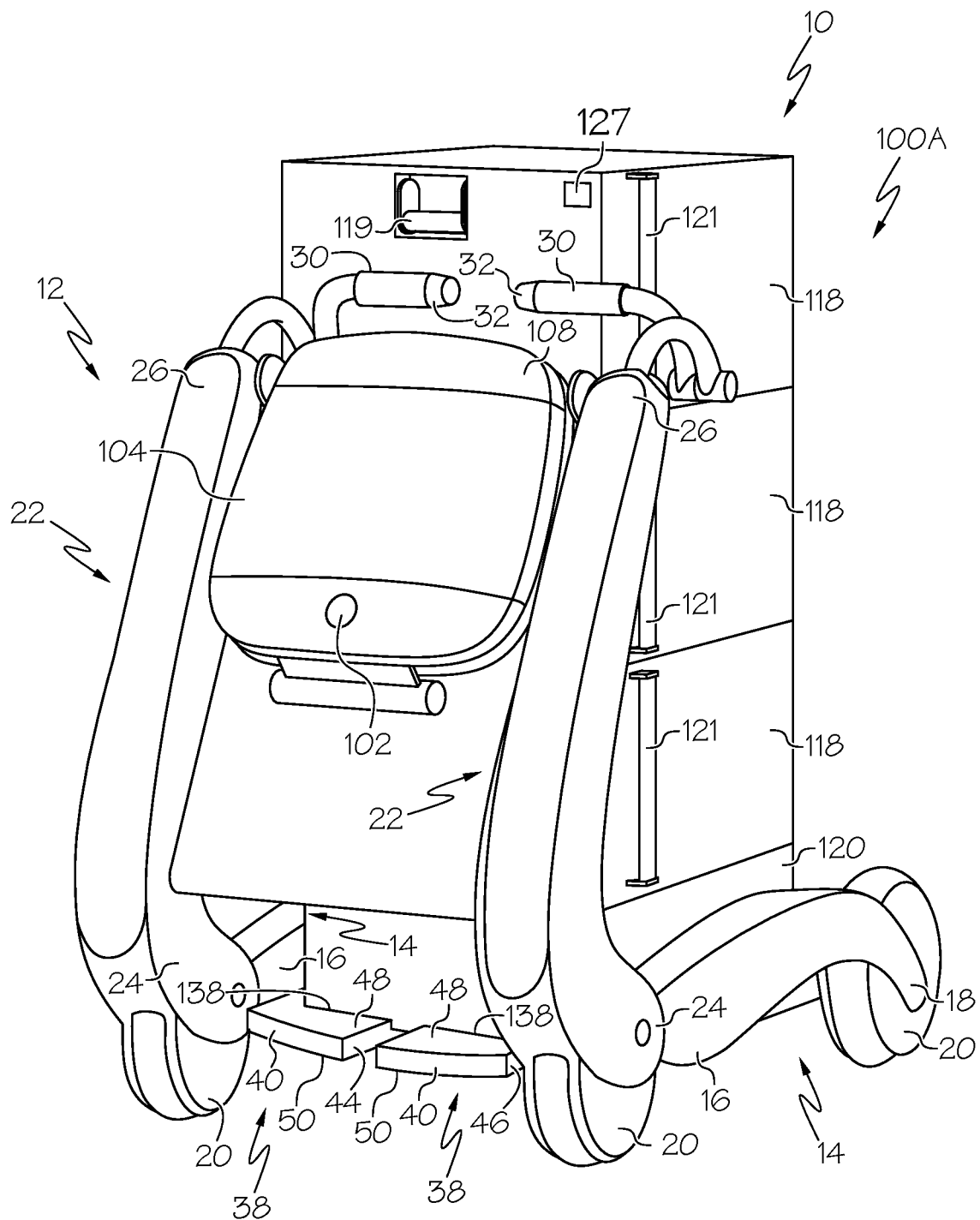
FIG. 4A schematically depicts a front view of an example cargo transport mode of the mobility device transporting a stack of cargo containers according to one or more embodiments described and illustrated herein.
Figure 4B:
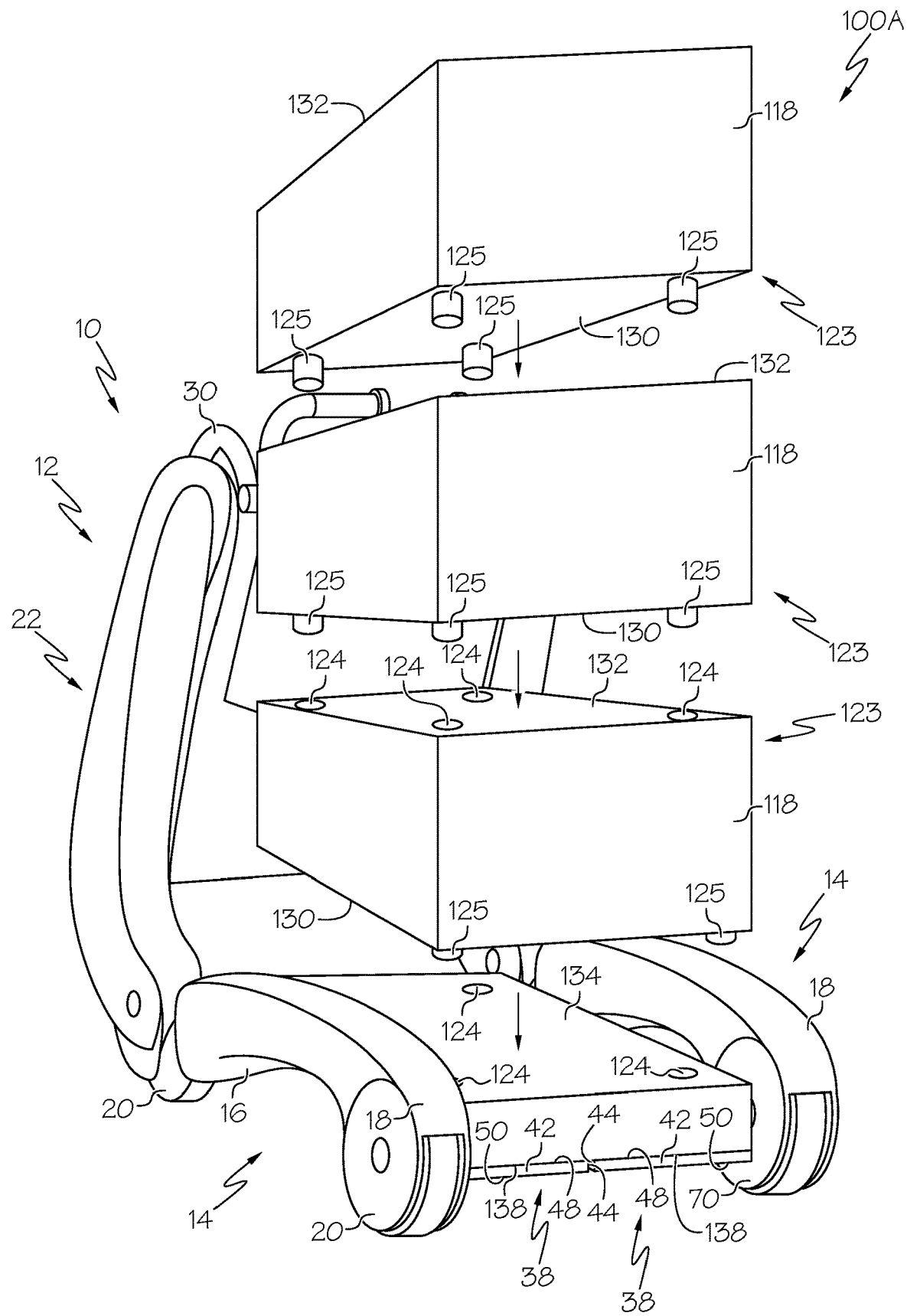
FIG. 4B schematically depicts a rear view of an example cargo transport mode of a mobility device depicted in FIG. 4A transporting a stack of cargo containers according to one or more embodiments described and illustrated herein.
Figure 4C:
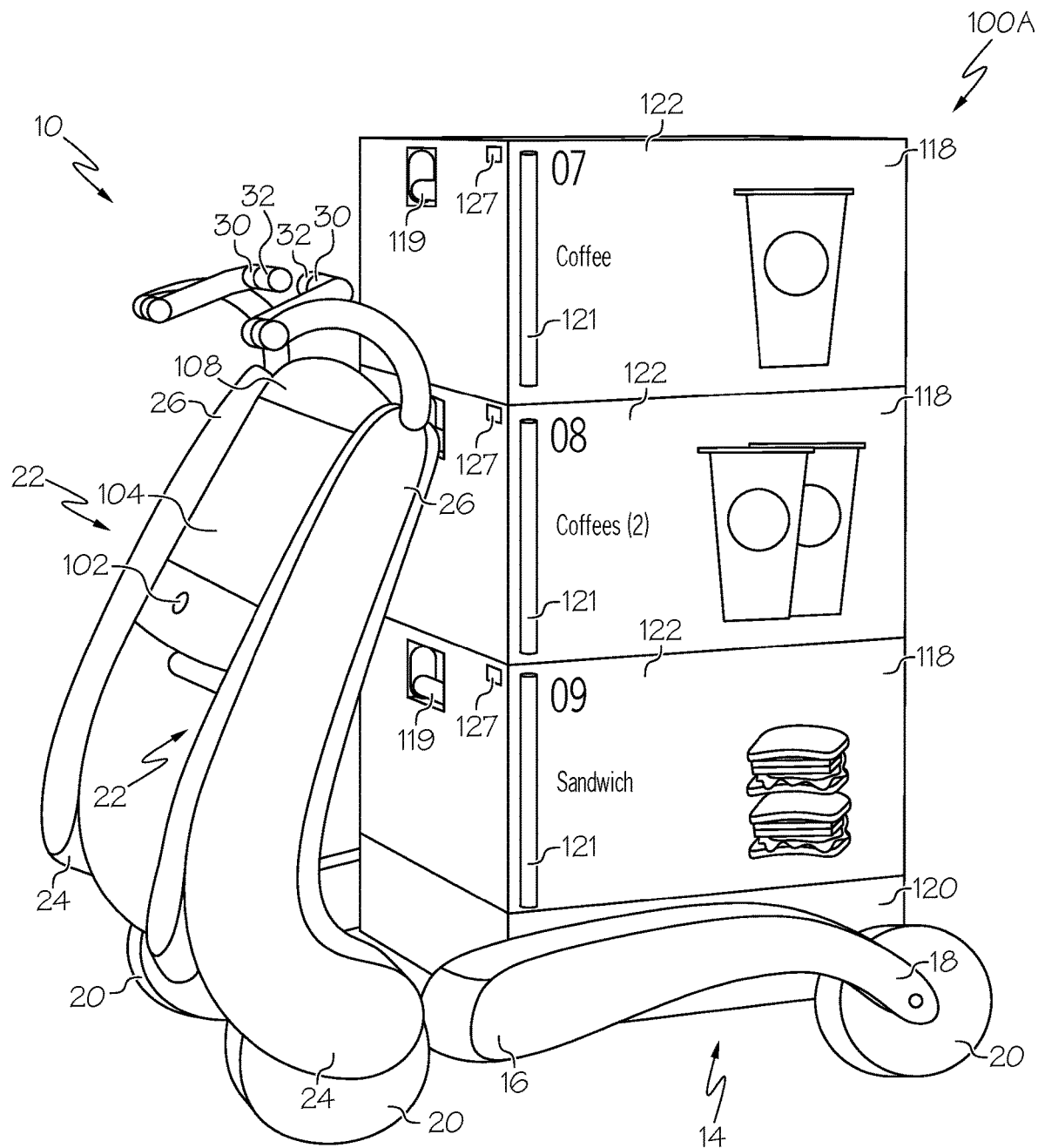
FIG. 4C schematically depicts a side perspective view of an example cargo transport mode of a mobility device transporting a stack of cargo containers having displays according to one or more embodiments described and illustrated herein.
Figure 4D:
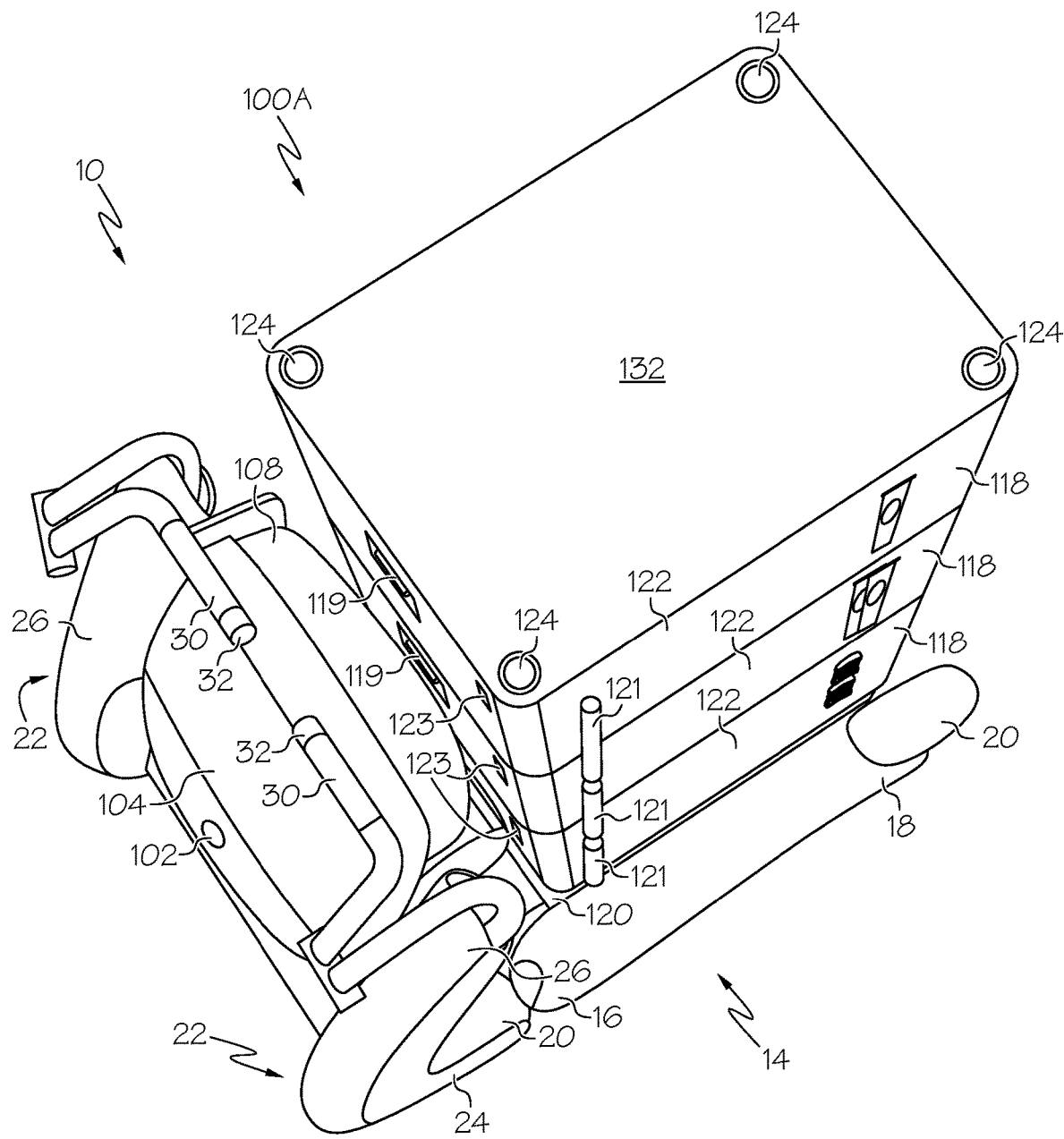
FIG. 4D schematically depicts a top perspective view of an example cargo transport mode of a mobility device depicted in FIG. 4C transporting a stack of cargo containers having displays according to one or more embodiments described and illustrated herein.

Now referring to FIGS. 4A-4D, the example cargo transport mode 100A of the mobility device 10 holding a stack of a plurality of cargo containers 118 is schematically illustrated. FIG. 4A is a front view of the cargo transport mode 100A with the stack of the plurality of cargo containers 118, FIG. 4B is a rear view, FIG. 4C is a side perspective view in which each one of the stack of the plurality of cargo containers 118 have cargo container displays 122, and FIG. 4D is a top view.

In FIGS. 4A, 4C and 4D, positioned between the arm 22 of the frame 12 is a camera 102 and an exterior display 104. As discussed in further detail below, the camera 102 and/or the exterior display 104 may provide for video conferenced communication. For example, the camera 102 and an exterior display 104 may provide telepresence/video conferencing functionality equivalent to the plurality of cargo containers 118 discussed herein. Further, it should be appreciated that in some embodiments, the camera 102 and the exterior display 104 are accessible on a rear side 108 of the seat member 34 provided between the pair of arms 22.

That is, when the seat member 34 is in the stowed position, the seat is in a generally vertical positon in the vertical direction (i.e., in the +/−Z direction) such that access to the rear side 108 and the camera 102 and/or the exterior display 104 is permitted.

In FIGS. 4A and 4B, the stack of a plurality of cargo containers 118 is positioned to rest or sit atop a base 120. The base 120 is depicted as spanning the foot plates 38. Further, in some embodiments, the foot plates 38 are received by a portion of the base 120, as discussed in greater detail herein. As discussed in further detail below, the base 120 may be utilized to provide power to the mobility device 10 and/or facilitate with data communication with one or more cargo containers 118. For example, the base 120 may act as a battery, and powers each of the cargo container displays 122 of the plurality of cargo containers 118.

That is, the cargo container 118 that sits directly atop the base 120 may receive power, data, heating, cooling, and the like, from the base 120. In this embodiment, the base 120 may also act as a conduit for data transmissions and/or power between the mobility device and one or more cargo containers 118, including cargo containers 118 not directly in contact with the base 120. A cargo container 118 in direct contact with the base 120 may, in turn, act as a conduit for power and/or data to other cargo containers 118 sitting above it in the vertical direction (i.e., in the +/−Z direction). The cargo containers 118 may interlock with each other, which can increase stability, as discussed in greater detail herein.

Embodiments of the cargo containers 118 may be insulated and/or provide temperature control (heating/cooling) for temperature-sensitive items such as foods and medications. The cargo containers 118 may have side handles 119 for carrying. The cargo containers 118 in this embodiment are secure containers that may be opened with a front handle 121 once unlocked. As discussed in greater detail further below, at least one of the plurality of cargo containers 118 may feature an authentication device 127 that may be any device or combination of devices for authenticating a user, such as a camera, microphone, biometric scanner, and the like.

In the embodiment depicted in FIGS. 4C-4D, the cargo containers 118 feature cargo container displays 122. The cargo container displays 122 may provide any suitable type of information, such as anything that relates to the item(s) contained inside. As depicted in FIG. 4C, the cargo container displays 122 may display content pertaining to the item contained inside, such as graphics/images/videos (coffee, sandwich, etc.), text, an item number, a scannable code (QR code, bar code, and the like), current temperature inside the container, and the like. In some embodiments, advertisements may be presented, such as presenting related items/services on the cargo container displays 122 when the item inside is being retrieved. In another embodiment, the authentication device 127 and the cargo container displays 122 are on the same side of a cargo container 118 to facilitate telepresence/video conferencing. For example, after being authenticated, a user picking up a prescription may request or be required to do a video consultation with a medical professional prior to the cargo container 118 being unlocked.

FIGS. 4B and 4D depict a cargo container interlocking system 123 which may allow the plurality of cargo containers 118 to form stable stacks by interlocking the top of one cargo container 118 with the bottom of another cargo container 118 (such as allowing the cargo containers 118 snap together, press fit together, and the like). In some embodiments, the cargo container interlocking system 123 may include a plurality of receiving portions 124 and a plurality of corresponding elongated members 125. As depicted in FIGS. 4B and 4D, in some embodiments, the cargo container interlocking system 123 includes four receiving portions 124 and four corresponding elongated members 125 positioned at the four corners of each container. In other embodiments, there may be more or less than four receiving portions 124 and four corresponding elongated members 125 and they may be positioned anywhere on the container 118.

In the illustrated embodiment, each container 118 includes a container lower surface 130 and a container upper surface 132 in which the four receiving portions 124 are positioned within the container upper surface 132 and the four corresponding elongated members 125 extend from the container lower surface 130. The four corresponding elongated members 125 extend from the container lower surface 130 at each corner of the container 118 and the four corresponding receiving portions 124 extend from into the container upper surface 132 at each corner of the container 118. As such, the cargo container interlocking system 123 couples the container sitting above it in the vertical direction (i.e., in the +/−Z direction) to the stack of containers below it.

In some embodiments, the plurality of receiving portions 124 may be cylindrical in shape and the plurality of corresponding elongated members 125 have a matching shape. In other embodiments, the plurality of receiving portions 124 may be any uniform or irregular shape, such as a cube, rectangular, triangular, and the like. Further, the plurality of corresponding elongated members 125 have a matching shape such as a cube, rectangular, triangular, and the like. In other embodiments, one or all the plurality of receiving portions 124 have the same shape or a different shape. Further, in this embodiment, one or all the plurality of corresponding elongated members 125 have the same shape or a different shape. Further, in some embodiments, each of the plurality of corresponding elongated members 125 may be locked into the each of the plurality of receiving portions 124 via a resilient member.

The cargo container interlocking system 123 may additionally provide for the flow of power and/or data between the plurality of cargo containers 118 in a stack, the mobility device in cargo transport mode 100A, and/or the base 120. Any suitable types of electrical and/or data conduits may be utilized. That is, at least portions of the plurality of receiving portions 124 and portions of the plurality of corresponding elongated members 125 may have conductive mediums in contact with one another to communicatively couple the containers to one another such that electrical and/or data may be transferred among the containers 118.

In other embodiments, power and/or data may be transferred wirelessly (i.e., without direct contact) between the plurality of cargo containers 118 in the stack, the mobility device in cargo transport mode 100A, and/or a base 120. For example, the cargo container 118 at the top of a stack may transmit data conveying its current internal temperature and required temperature (such as based on the requirements of the item contained therein). In response, the mobility device 10 may transmit data containing a response and power to help the top cargo container 118 maintain its temperature. In another example, the base 120 may be utilized to provide power to the cargo container 118 to start or continue displaying content on its cargo container display 122, or to conduct authentication of a user via the authentication device 127.

Figure 5A:
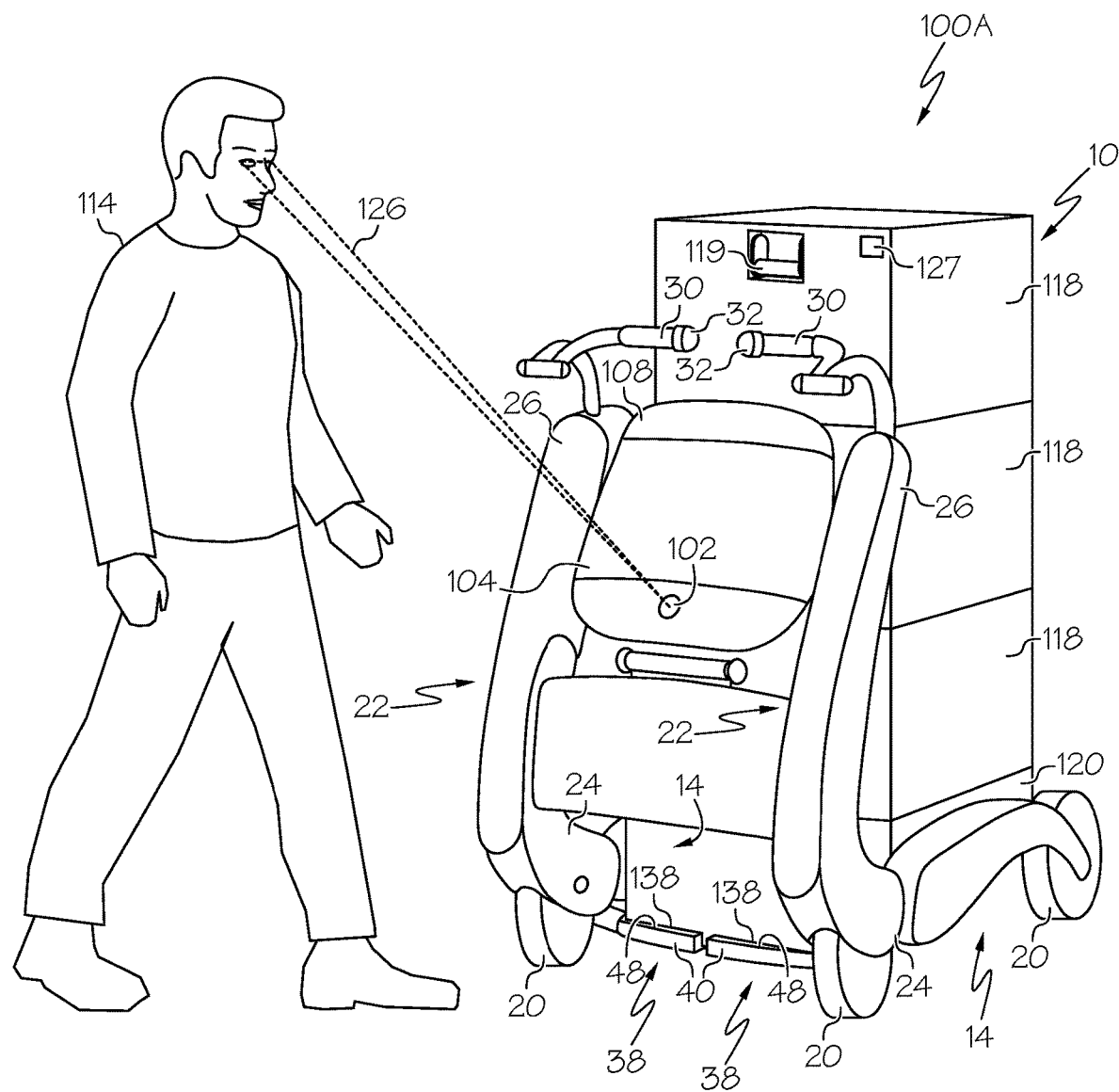
FIG. 5A schematically depicts a front view of an example cargo transport mode of a mobility device with a stack of cargo containers performing biometric authentication according to one or more embodiments described and illustrated herein.

Referring now to FIG. 5A, a front view of the example cargo transport mode 100A of the mobility device 10 with the stack of the plurality of cargo containers 118 performing biometric authentication is schematically illustrated. In this embodiment, a user 114 has approached the mobility device 10 and is being authenticated 126 by the camera 102 of the mobility device 10. In this example, the eyes of the user 114 are being scanned, although any suitable form of authentication 126 may be utilized, such as facial recognition, voice analysis, fingerprint scanning (such as via the exterior display 104, the authentication device 127, and/or cargo container displays 122), scanning a user's identification (such as government-issued ID), code (such as a QR code displayed on their phone), a password entered on a touchscreen display (such as via the exterior display 104 and/or cargo container displays 122), and the like. Authentication may be used for the delivery of a variety of items such as food, medications, documents (including confidential documents), and the like. The authentication functionality described herein with respect to the mobility device may be performed by at least one of the plurality of cargo containers 118. Relevant content may be shown to the user 114 on not only the display of the cargo container 118 containing the item sought, but also on other cargo containers 118 and/or the exterior display 104 of the mobility device 10.

Figure 5B:
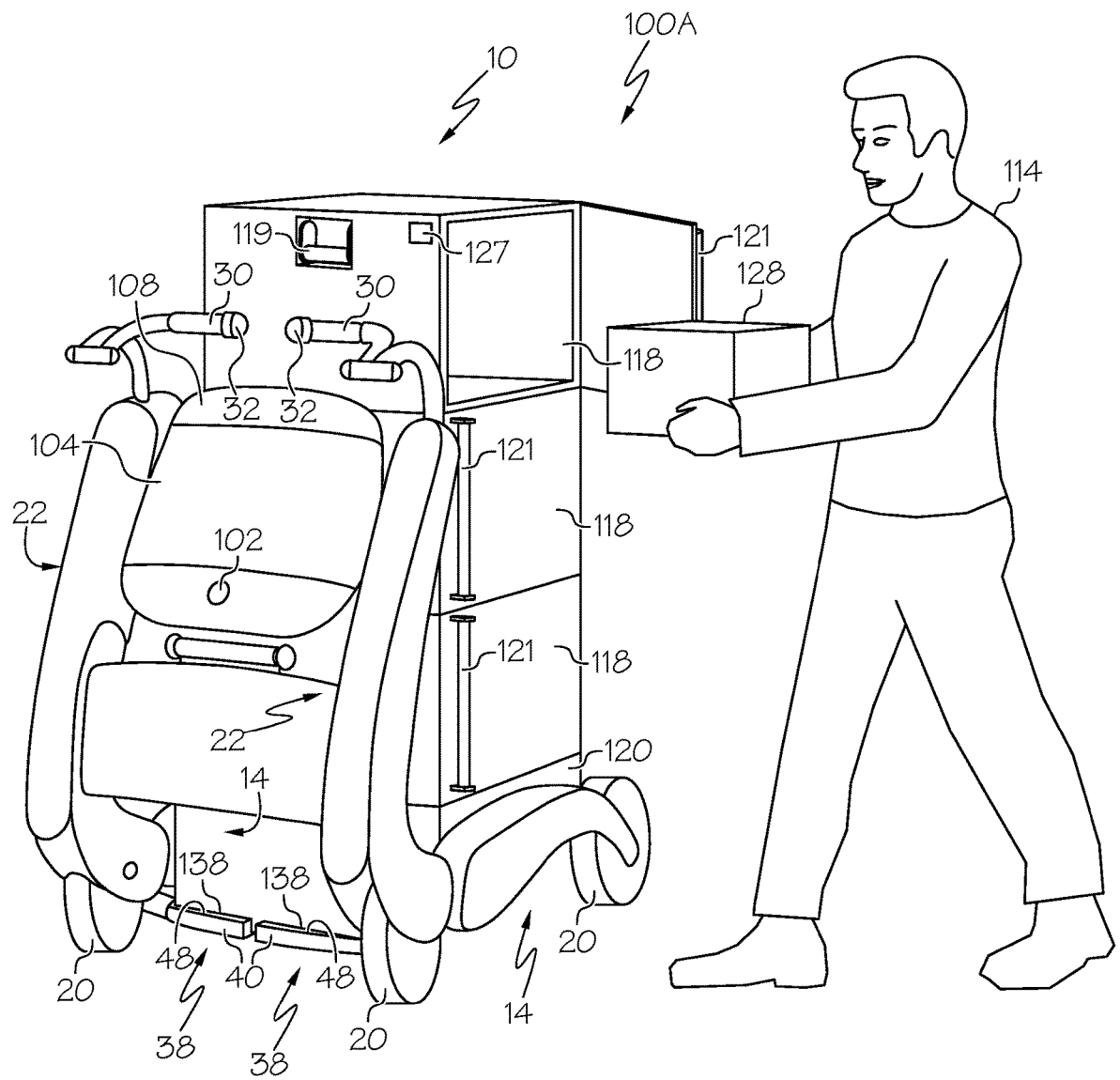
FIG. 5B schematically depicts a front view of an example cargo transport mode of a mobility device providing access to an item within one of the cargo containers according to one or more embodiments described and illustrated herein.

Referring now to FIG. 5B, an example a front view of the example cargo transport mode 100A of the mobility device 10 with the stack of the plurality of the cargo containers 118 performing biometric authentication is schematically illustrated. Based upon the user 114 having been authenticated, the corresponding cargo container 118 unlocks and allows the user 114 to open it and take an item 128 from inside. In some embodiments, each one or some of the plurality of cargo containers 118 may be opened with a front handle 121 once unlocked. In other embodiments, the cargo container 118 may open itself so that the user 114 need only reach inside to retrieve the item 128. In other embodiments, cargo containers 118 may utilize other security measures such as lock and key, or may not be locked (such as in a secure facility, for example, where only select users would have access).

Referring back to FIGS. 4A-5B, the cargo containers 118 may have side handles 119 for carrying. The side handles 119 may be used to load or unloaded the plurality of containers 118 onto or from the base 120 in the stack configuration. Further, the side handles 119 may be positioned on opposite sides as the cargo container displays 122 of the plurality of cargo containers 118 so to not interfere with the displayed content. As discussed further below, a cargo container 118 may feature an authentication device 127 that may be any device or combination of device for authenticating a user, such as a camera, microphone, biometric scanner, and the like.

Figure 6:
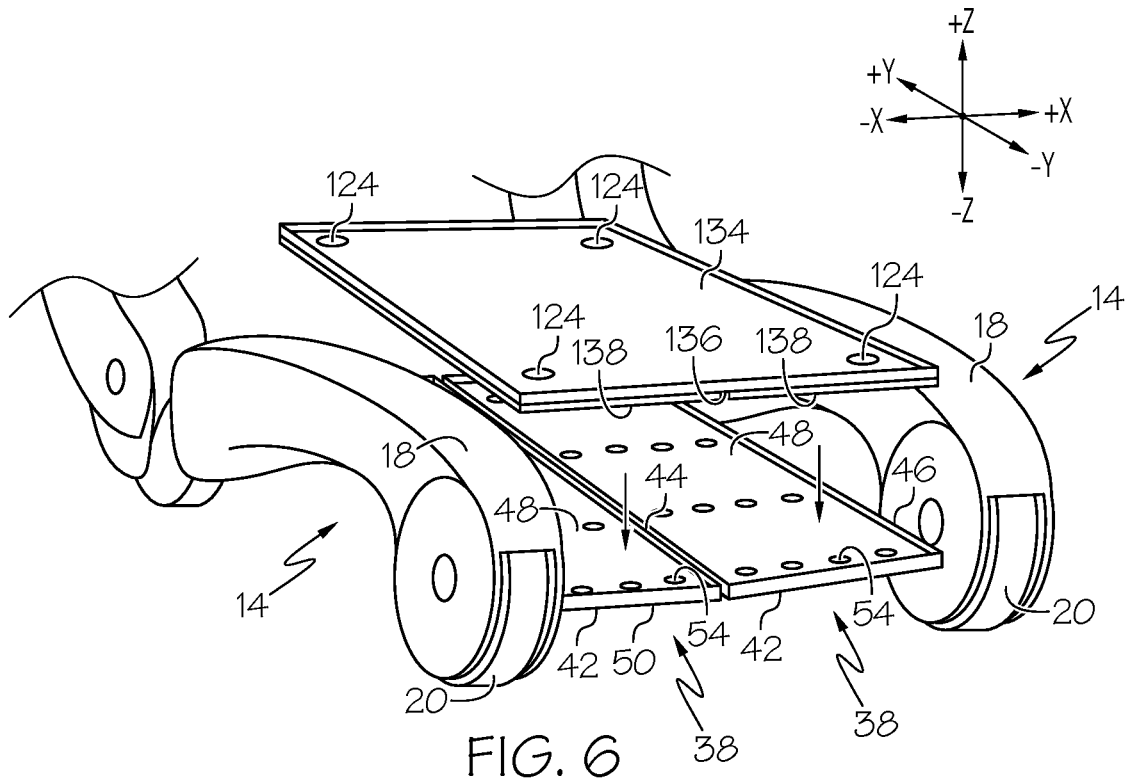
FIG. 6 schematically depicts a partial isolated view of the mobility device in the cargo transport position of FIG. 4A with a first aspect of a base according to one or more embodiments described and illustrated herein.

Now referring to FIG. 6, an isolated perspective view of a first aspect of the base 120 is schematically depicted. In this aspect, the base 120 may be a planar member having an upper surface 134 and an opposite lower surface 136 that define a thickness. In some embodiments, the lower surface 136 has a pair of receiving channels 138 that extend towards the upper surface 134. Each of the pair of receiving channels 138 compliment a length and a width of the foot plates 38. That is, in the unfolded position, the foot plates 38 are received into the pair of receiving channels 138, in some embodiments, as a snap fit configuration. In other embodiments, the pair of foot plates 38 are received into the pair of receiving channels 138 and the base 120 is coupled to the pair of foot plates 38 via a hook and loop configuration, a lock, a strap, and/or the like.

In other embodiments, the lower surface 136 has a single receiving channel 138 that extends towards the upper surface and receives the pair of foot plates 38. The upper surface of the base 120 includes the plurality of receiving portions 124 of the cargo container interlocking system 123 that receives the corresponding elongated members 125 of the container 118 positioned directly onto the base 120. As such, the base 120 may be a support member that provides strength and stability so that the mobility device 10 may transport the plurality of containers 118 when in the example cargo transport mode 100A.

Figure 7:
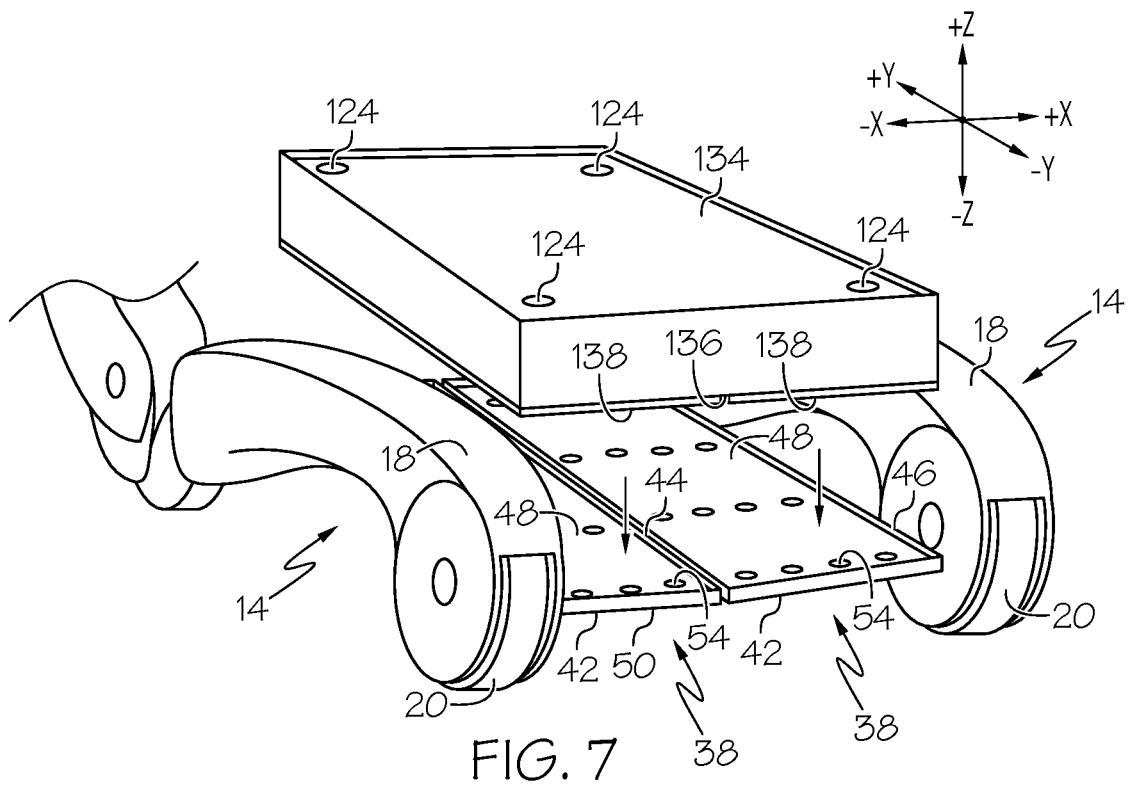
FIG. 7 schematically depicts a partial isolated view of the mobility device in the cargo transport position of FIG. 4A with a second aspect of a base according to one or more embodiments described and illustrated herein.

Now referring to FIG. 7, an isolated perspective view of a second aspect of the base 120 is schematically depicted. In this aspect, the base 120 may be a planar member having the upper surface 134 and the opposite lower surface 136 that define a thickness. Further, in the second aspect, the base 120 may be a battery. The battery may be any device capable of storing electric energy for later use by the mobility device 10 and/or the plurality of containers 118. As such, in some embodiments, the base 120 includes the components necessary to function as a battery positioned between the upper surface 134 and the lower surface 136. In other embodiments, the battery components may be positioned anywhere on the base 120 (i.e., extend below the lower surface 136). In some embodiments, the lower surface 136 includes the pair of receiving channels 138 that extend towards the upper surface 134. Each of the pair of receiving channels 138 compliment the length and the width of the foot plates 38. That is, in the unfolded position, the foot plates 38 are received into the pair of receiving channels 138. In other embodiments, the lower surface 136 has a single receiving channel 138 that extends towards the upper surface 134 and receives the pair of foot plates 38.

The upper surface 134 of the base 120 includes the plurality of receiving portions 124 of the cargo container interlocking system 123 that receives the corresponding plurality of elongated members 125 of the container 118 positioned directly onto the base 120. Each of the plurality of receiving portions 124 include a conductive medium configured to provide the necessary power to each of the plurality of containers 118 through the cargo container interlocking system 123, as discussed herein. That is, the conductive medium of each of the plurality of receiving portions 124 may be communicatively coupled with each of the plurality of corresponding elongated members 125 of the container positioned in contact with the upper surface 134 of the base 120 such that the battery positon of the base 120 provides the necessary power to each of the plurality of containers 118.

The next container, in the vertical direction (i.e., in the +/−Z direction) then is communicatively coupled to the container 118 below in the vertical direction (i.e., in the +/−Z direction) to communicatively couple both containers to the base 120. It should be appreciated that this continues for all the containers 118 with the stack. As such, the base 120 communicatively couples the containers 118 to the base 120 in a series configuration.

Figure 9:
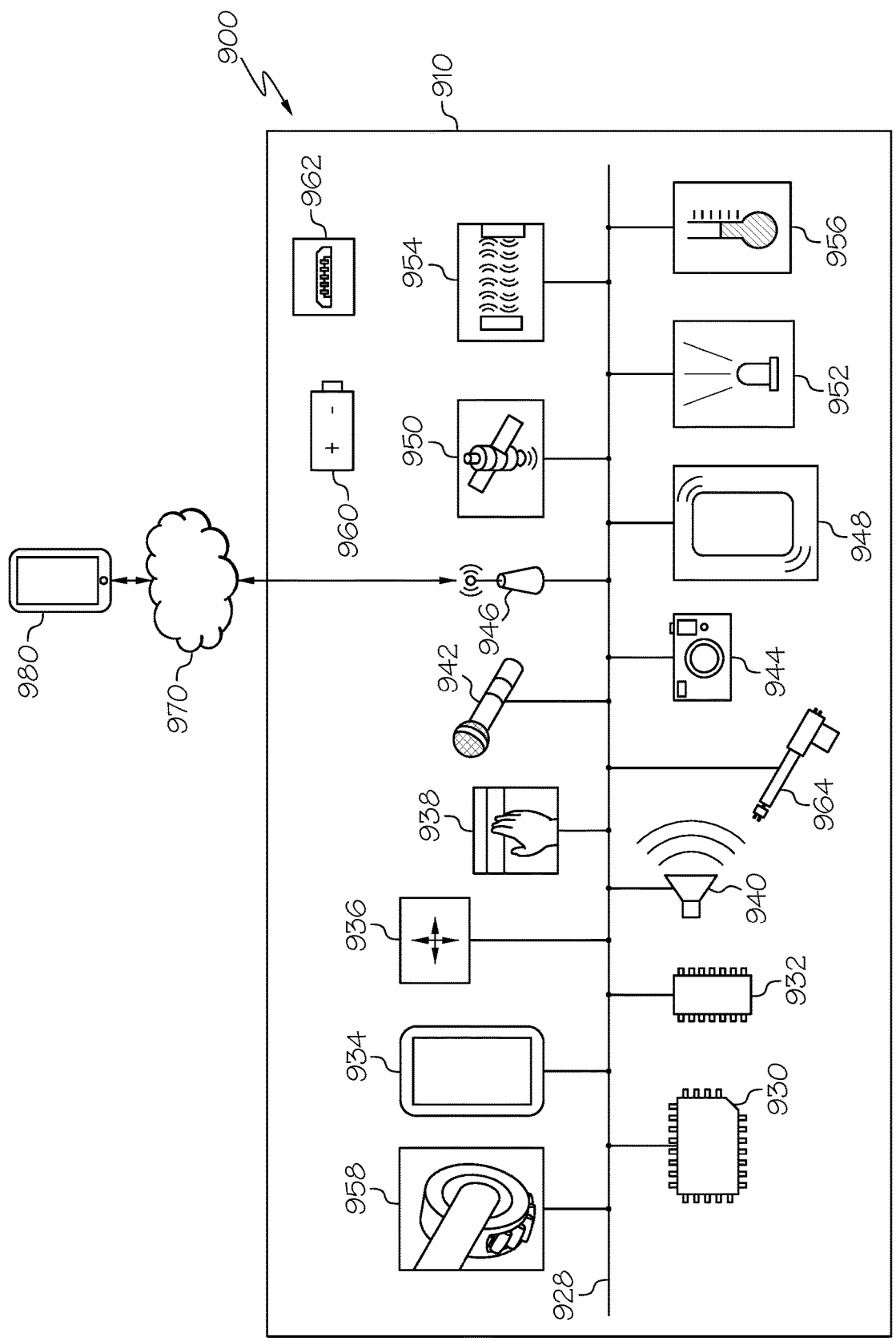
FIG. 9 is a block diagram illustrating hardware utilized in one or more mobility devices for implementing various processes and systems, according one or more embodiments described and illustrated herein.

The battery portion of the base 120 may include a charging port that is charged using conventional methods such as with a plug. The charging port may be positioned on the lower surface 136, the upper surface 134, and/or any other surface of the base 120. In other embodiments, the battery portion of the base 120 may be charged using a battery or plug of the mobility device 10 for example a battery 960 (FIG. 9). That is, the motor and/or power components of the mobility device 10 may also be used to charge or discharge the battery portion of the base 120. In some embodiments, the battery portion of the base 120 is a rechargeable battery, such as a lithium-ion battery or a nickel-cadmium battery.

It should be appreciated that, in the second aspect, the base 120 is a battery that provides the necessary power to each of the containers 118 positioned within the stack and may be a support member that provides strength and stability so that the mobility device 10 may transport the plurality of containers 118 when in the example cargo transport mode 100A.

Figure 8:
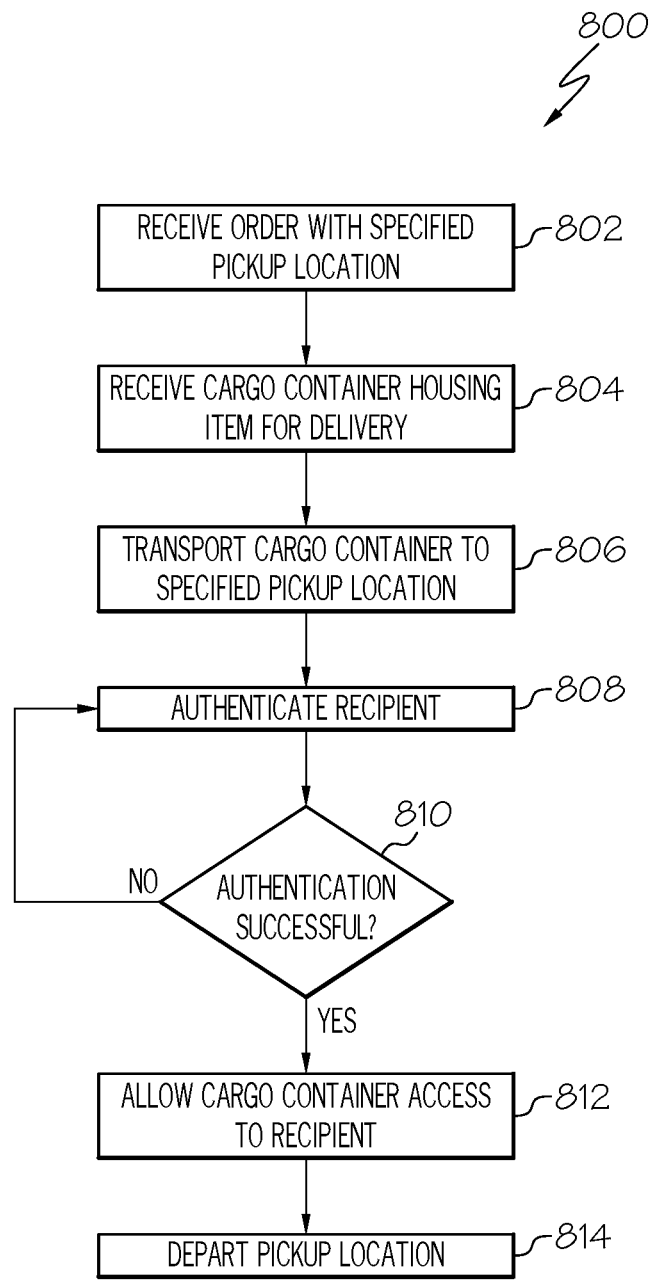
FIG. 8 is a flow chart depicting an exemplary process of illustrates an exemplary process of utilizing the cargo transport mode of the mobility device to deliver one or more items to a user at a specified location, according to one or more embodiments described and illustrated herein.

Turning now to FIG. 8, a flowchart 800 illustrates an exemplary process for the cargo transport mode of the mobility device to deliver one or more items to a user at a specified location (specified by the user or any other suitable party or software). At block 802, an order from a user is received by the mobility device. This may be, by way of non-limiting example, for warehouse goods purchased by a user and the mobility device is either located at the warehouse or travels to the warehouse, in which the goods are contained in one or more cargo containers. In another example, the user may have placed an order for a prescription from a pharmacy, such that the mobility device travels to the pharmacy to receive a cargo container containing the prescription by the requesting user. In another embodiment, the user may have placed an item they own in storage, such as in a cargo container within a storage unit, such that the mobility device travels to the storage to receive the cargo container containing the user's requested item. Although this example corresponds to the cargo transport mode depicted in FIGS. 4A-5B, other suitable modes may be utilized.

At block 804, the cargo container that houses one or more requested goods/items is retrieved for delivery by the mobility device. A cargo container may be placed atop a base, another cargo container, or a foot plate of the mobility device. At block 806, the cargo container may be transported to the specified location utilizing any suitable automated navigation (utilizing GPS or the like), remote control by a user or software, or being controlled or otherwise directed by a user in control of the mobility device. At block 808, a user may be authenticated by the mobility device, and/or cargo container. Any suitable type of authentication may be utilized, which may include by way of non-limiting examples facial/eye recognition via cameras or the authentication device (such as the eye scanning depicted in FIG. 5A), voice analysis via microphones (discussed below), password or fingerprint authentication via the display, which may be touch screens/finger scanners, two-factor authentication (such as sending a code to the user's registered smart phone), and the like.

At block 810, a determination is made as to whether the user is successfully authenticated. If not, then the flowchart returns to 808 where another authentication attempt may be made. In one embodiment, a user may be invited to try another form of authentication if unsuccessful after one or more attempts. In some embodiments, there may be limits placed to bolster security of the cargo, such as only allowing a user to have three attempts at authentication before being blocked from further attempts. If the user is successfully authenticated, then at block 812 the cargo container or under-seat container may unlock or otherwise provide access to the item(s) requested/purchased by the user, as depicted in FIG. 5B. In some embodiments, communications (advertisements, product disclaimers, warranty information, upgrades for purchase, and the like) may be presented to the user visually on the screens of the mobility device or cargo container, via audio through the audio output devices of the mobility device or cargo container, and the like. At block 814, the mobility device departs after the user has received their item/good, or if the user has failed to authenticate.

Turning now to FIG. 9, example components of one non-limiting embodiment of a mobility device 900 is schematically depicted. The mobility device 900 may include a frame 910, a communication path 928, a processor 930, a memory module 932, a display 934, an inertial measurement unit 936, an input device 938, an audio output device 940 (e.g., a speaker), a microphone 942, a camera 944, network interface hardware 946, a tactile feedback device 948, a location sensor 950, a light 952, a proximity sensor 954, a temperature sensor 956, a motorized wheel assembly 958, a battery 960, a charging port 962 and/or an actuator 964. The components of the mobility device 900 other than the frame 910 may be contained within or mounted to the frame 910. The various components of the mobility device 900 and the interaction thereof will be described in detail below.

Still referring to FIG. 9, the communication path 928 may be formed from any medium that is capable of transmitting a signal such as, for example, conductive wires, conductive traces, optical waveguides, or the like. Moreover, the communication path 928 may be formed from a combination of mediums capable of transmitting signals. In one embodiment, the communication path 928 includes a combination of conductive traces, conductive wires, connectors, and buses that cooperate to permit the transmission of electrical data signals to components such as processors, memories, sensors, input devices, output devices, and communication devices. Accordingly, the communication path 928 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 928 communicatively couples the various components of the mobility device 900. In some embodiments, the mobility device 900 and the cargo containers 118 depicted in FIGS. 4A-6B may each have a communication path 928 wherein various components described herein communicate between the mobility device 900 and the cargo containers 118. For example, the cargo container interlocking system 123 may form the communication path 928. In another embodiment, one communication path 928 may be formed between the various components described herein of both the mobility device 900 and a cargo container 118.

The processor 930 of the mobility device 900 may be any device capable of executing machine-readable instructions. Accordingly, the processor 930 may be a controller, an integrated circuit, a microchip, a computer, or any other computing device. The processor 930 may be communicatively coupled to the other components of the mobility device 900 by the communication path 928, such as the various modes 100A-B depicted in FIGS. 1A-6B. For example, a control unit configured to operate the plurality of actuators may be the processor 930. In some embodiments, the processor 930 may be utilized to perform the various functions of the cargo containers 118 (FIG. 5A). Accordingly, the communication path 928 may communicatively couple any number of processors with one another, and allow the components coupled to the communication path 928 to operate in a distributed computing environment. Specifically, each of the components may operate as a node that may send and/or receive data. While the embodiment depicted in FIG. 9 includes a single processor 930, other embodiments may include more than one processor.

Still referring to FIG. 9, the memory module 932 of the mobility device 900 is coupled to the communication path 928 and communicatively coupled to the processor 930. The memory module 932 may, for example, contain instructions to perform authentication 126 of a user 114, as depicted in FIG. 5A. The memory module 932 may comprise RAM, ROM, flash memories, hard drives, or any non-transitory memory device capable of storing machine-readable instructions such that the machine-readable instructions can be accessed and executed by the processor 930. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 932. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 9 includes a single memory module 932, other embodiments may include more than one memory module.

The tactile display 934, if provided, is coupled to the communication path 928 and communicatively coupled to the processor 930. The tactile display 934 may be any device capable of providing tactile output in the form of refreshable tactile messages. A tactile message conveys information to a user by touch. For example, a tactile message may be in the form of a tactile writing system, such as Braille. A tactile message may also be in the form of any shape, such as the shape of an object detected in the environment. The tactile display 934 may provide information to the user regarding the operational state of the mobility device 900 and/or any one of the plurality of containers 118 (FIG. 4A).

Any known or yet-to-be-developed display may be used for the display 934, such as LCD, LED, plasma, OLED, CRT, projection, holographic, electronic paper, or any other type of suitable output display which may correspond to the exterior display 104 of the mobility device 900 and/or the cargo container displays 122. In some embodiments, the display 934 is a three dimensional tactile display including a surface, portions of which may raise to communicate information. The raised portions may be actuated mechanically in some embodiments (e.g., mechanically raised and lowered pins). The tactile display 934 may also be fluidly actuated, or it may be configured as an electrovibration tactile display.

The inertial measurement unit 936, if provided, is coupled to the communication path 928 and communicatively coupled to the processor 930. The inertial measurement unit 936 may include one or more accelerometers and one or more gyroscopes. The inertial measurement unit 936 transforms sensed physical movement of the mobility device 900 into a signal indicative of an orientation, a rotation, a velocity, or an acceleration of the mobility device 900. The operation of the mobility device 900 may depend on an orientation of the mobility device 900 (e.g., whether the mobility device 900 is horizontal, tilted, and the like). Some embodiments of the mobility device 900 may not include the inertial measurement unit 936, such as embodiments that include an accelerometer but not a gyroscope, embodiments that include a gyroscope but not an accelerometer, or embodiments that include neither an accelerometer nor a gyroscope.

Still referring to FIG. 9, one or more input devices 938 are coupled to the communication path 928 and communicatively coupled to the processor 930. The input device 938 may be any device capable of transforming user contact into a data signal that can be transmitted over the communication path 928 such as, for example, a button, a switch, a knob, a microphone or the like. In some embodiments, the input device 938 includes a power button, a volume button, an activation button, a scroll button, or the like. The one or more input devices 938 may be provided so that the user may interact with the mobility device 900, such as to navigate menus, make selections, set preferences, and other functionality described herein. In some embodiments, the input device 938 includes a pressure sensor, a touch-sensitive region, a pressure strip, or the like. It should be understood that some embodiments may not include the input device 938. As described in more detail below, embodiments of the mobility device 900 may include multiple input devices disposed on any surface of the frame 910. In some embodiments, one or more of the input devices 938 are configured as a fingerprint sensor for unlocking the robot. For example, only a user with a registered fingerprint may unlock and use the mobility device 900.

The speaker 940 (i.e., an audio output device) is coupled to the communication path 928 and communicatively coupled to the processor 930. The speaker 940 transforms audio message data from the processor 930 of the mobility device 900 into mechanical vibrations producing sound. In some embodiments, the speaker 940 may be utilized to perform audio output for the cargo containers 118, such as requesting authentication or other communication with a user. For example, the speaker 940 may provide to the user navigational menu information, setting information, status information, information regarding the environment as detected by image data from the one or more cameras 944, and the like. However, it should be understood that, in other embodiments, the mobility device 900 may not include the speaker 940.

The microphone 942 is coupled to the communication path 928 and communicatively coupled to the processor 930. The microphone 942 may be any device capable of transforming a mechanical vibration associated with sound into an electrical signal indicative of the sound. The microphone 942 may be used as an input device 938 to perform tasks, such as navigation of the mobility device 900, input settings and parameters, receive spoken commands at cargo containers 118 such as with the authentication device 127, and any other suitable tasks. It should be understood that some embodiments may not include the microphone 942.

Still referring to FIG. 9, the camera 944 is coupled to the communication path 928 and communicatively coupled to the processor 930. The camera 944 may be any device having an array of sensing devices (e.g., pixels) capable of detecting radiation in an ultraviolet wavelength band, a visible light wavelength band, or an infrared wavelength band. The camera 944 may correspond, for example, to the camera 102 of the mobility device 900 and/or the authentication device 127 of the cargo containers 118 (FIGS. 5A-5B). The camera 944 may have any resolution. The camera 944 may be an omni-directional camera, or a panoramic camera. In some embodiments, one or more optical components, such as a mirror, fish-eye lens, or any other type of lens may be optically coupled to the camera 944.

The network interface hardware 946 is coupled to the communication path 928 and communicatively coupled to the processor 930. The network interface hardware 946 may be any device capable of transmitting and/or receiving data via a network 970. Accordingly, network interface hardware 946 can include a wireless communication module configured as a communication transceiver for sending and/or receiving any wired or wireless communication. For example, the network interface hardware 946 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 946 includes hardware configured to operate in accordance with the Bluetooth® wireless communication protocol. In another embodiment, network interface hardware 946 may include a Bluetooth® send/receive module for sending and receiving Bluetooth® communications to/from a portable electronic device 980. The network interface hardware 946 may also include a radio frequency identification ("RFID") reader configured to interrogate and read RFID tags.

In some embodiments, the mobility device 900 may be communicatively coupled to a portable electronic device 980 via the network 970. In some embodiments, the network 970 is a personal area network that utilizes Bluetooth® technology to communicatively couple the mobility device 900 and the portable electronic device 980. In other embodiments, the network 970 may include one or more computer networks (e.g., a personal area network, a local area network, or a wide area network), cellular networks, satellite networks and/or a global positioning system and combinations thereof. Accordingly, the mobility device 900 can be communicatively coupled to the network 970 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 9, as stated above, the network 970 may be utilized to communicatively couple the mobility device 900 with the portable electronic device 980. The portable electronic device 980 may include a mobile phone, a smartphone, a personal digital assistant, a camera, a dedicated mobile media player, a mobile personal computer, a laptop computer, and/or any other portable electronic device capable of being communicatively coupled with the mobility device 900. The portable electronic device 980 may include one or more processors and one or more memories. The one or more processors can execute logic to communicate with the mobility device 900. The portable electronic device 980 may be configured with wired and/or wireless communication functionality for communicating with the mobility device 900. In some embodiments, the portable electronic device 980 may perform one or more elements of the functionality described herein, such as in embodiments in which the functionality described herein is distributed between the mobility device 900 and the portable electronic device 980.

The tactile feedback device 948 is coupled to the communication path 928 and communicatively coupled to the processor 930. The tactile feedback device 948 may be any device capable of providing tactile feedback to a user. The tactile feedback device 948 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 948.

The location sensor 950 is coupled to the communication path 928 and communicatively coupled to the processor 930. The location sensor 950 may be any device capable of generating an output indicative of a location. In some embodiments, the location sensor 950 includes a global positioning system (GPS) sensor, though embodiments are not limited thereto. Some embodiments may not include the location sensor 950, such as embodiments in which the mobility device 900 does not determine a location of the mobility device 900 or embodiments in which the location is determined in other ways (e.g., based on information received from the camera 944, the microphone 942, the network interface hardware 946, the proximity sensor 954, the inertial measurement unit 936 or the like). The location sensor 950 may also be configured as a wireless signal sensor capable of triangulating a location of the mobility device 900 and the user by way of wireless signals received from one or more wireless signal antennas. In some embodiments, a cargo container 118 may utilize a location sensor 950 to determine its current location in relation to a specified pickup location, as depicted for example in 806 in FIG. 8. In other embodiments, the mobility device 900 may utilize its location sensor 950 to perform this functionality.

The motorized wheel assembly 958 is coupled to the communication path 928 and communicatively coupled to the processor 930. The motorized wheel assembly 958 includes motorized wheels, such as 106 in FIGS. 1-6, that are driven by one or motors. The processor 930 may provide one or more drive signals to the motorized wheel assembly 958 to actuate the motorized wheels such that the mobility device 900 travels to a desired location, such as a location that the user wishes to acquire the item 128, or cargo, as depicted in FIGS. 6A-B (e.g., the location of particular objects within at or near the desired location).

Still referring to FIG. 9, the light 952 is coupled to the communication path 928 and communicatively coupled to the processor 930. The light 952 may be any device capable of outputting light, such as, but not limited to, a light emitting diode, an incandescent light, a fluorescent light, or the like. Some embodiments include a power indicator light that is illuminated when the mobility device 900 is powered on. Some embodiments include an activity indicator light that is illuminated when the mobility device 900 is active or processing data. Some embodiments include an illumination light for illuminating the environment in which the mobility device 900 is located. Some embodiments may not include the light 952.

The proximity sensor 954 is coupled to the communication path 928 and communicatively coupled to the processor 930. The proximity sensor 954 may be any device capable of outputting a proximity signal indicative of a proximity of the mobility device 900 to another object. In some embodiments, the proximity sensor 954 may include a laser scanner, a capacitive displacement sensor, a Doppler effect sensor, an eddy-current sensor, an ultrasonic sensor, a magnetic sensor, an internal sensor, a radar sensor, a LIDAR sensor, a sonar sensor, or the like. In some embodiments, a cargo container 118 may utilize a proximity sensor 954 to determine whether a user 114 is approaching. In other embodiments, the mobility device 900 may utilize its proximity sensor 954 to perform this functionality. In other embodiments may not include the proximity sensor 954, such as embodiments in which the proximity of the mobility device 900 to an object is determine from inputs provided by other sensors (e.g., the camera 944, the speaker 940, etc.).

The temperature sensor 956 is coupled to the communication path 928 and communicatively coupled to the processor 930. The temperature sensor 956 may be any device capable of outputting a temperature signal indicative of a temperature sensed by the temperature sensor 956. In some embodiments, the temperature sensor 956 may include a thermocouple, a resistive temperature device, an infrared sensor, a bimetallic device, a change of state sensor, a thermometer, a silicon diode sensor, or the like. Some embodiments of the mobility device 900 may not include the temperature sensor 956.

Still referring to FIG. 9, the mobility device 900 is powered by the battery 960, which is electrically coupled to the various electrical components of the mobility device 900. The battery 960 may be any device capable of storing electric energy for later use by the mobility device 900. In some embodiments, the battery 960 is a rechargeable battery, such as a lithium-ion battery or a nickel-cadmium battery. In embodiments in which the battery 960 is a rechargeable battery, the mobility device 900 may include the charging port 962, which may be used to charge the battery 960. Some embodiments may not include the battery 960, such as embodiments in which the mobility device 900 is powered the electrical grid, by solar energy, or by energy harvested from the environment. Some embodiments may not include the charging port 962, such as embodiments in which the apparatus utilizes disposable batteries for power.

The actuator 964 may be coupled to the communication path 928 and the frame 910 of the mobility device and communicatively coupled to the processor 930. One or more actuators 964 may be utilized to move the frame 910 between the plurality of configurations/modes, such as the cargo transport mode 100A depicted in FIGS. 1 and 3 and the walker mode 100B depicted in FIG. 2. The actuator may also move one or both foot plates 38 (FIG. 1). The actuator may also be utilized to control the opening/closing, for example, of the cargo containers 118 as depicted in FIG. 5B.

It should now be understood that embodiments of the present disclosure are directed to a multi-function mobility device that is configurable in a variety of configurations, such as a cargo transport mode. While in the cargo transport mode, the multi-function mobility device can transport interlocking cargo containers that can be used to securely transport items requested by users. The cargo containers may also include displays that can provide further information regarding the item inside.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-function mobility device comprising:
a frame having a pair of side rails;
a pair of foot plates pivotally attached to the pair of side rails, each of the pair of foot plates having a transport surface; and
a base removable from the pair of foot plates and having an upper surface and an opposite lower surface, the lower surface of the base including at least one receiving cavity that corresponds to a shape of the pair of foot plates,
wherein the base is positioned on the transport surface to receive the pair of foot plates within the at least one receiving cavity and is configured to receive a plurality of cargo containers on the upper surface.

2. The multi-function mobility device of claim 1, wherein the multi-function mobility device is configured to transport the plurality of cargo containers having a data or electrical connections.

3. The multi-function mobility device of claim 2, wherein the base is a battery.

4. The multi-function mobility device of claim 3, wherein the base is configured to provide data or electricity to a first cargo container in direct contact with the base.

5. The multi-function mobility device of claim 4, wherein the base is further configured to indirectly provide data or electricity to a second cargo container not in direct contact with the base by utilizing the first cargo container as a conduit to provide the data or electricity to the second cargo container.

6. The multi-function mobility device of claim 4, wherein the base and each of the plurality of cargo containers further comprises:
a cargo transport interlocking system comprising:
a plurality of receiving portions; and
a plurality of corresponding elongated members,
wherein each one of the plurality of corresponding elongated members are received in the corresponding plurality of receiving portions to interlock each of the plurality of cargo containers.

7. The multi-function mobility device of claim 4, wherein the plurality of cargo containers are stacked upon one another in a vertical direction.

8. The multi-function mobility device of claim 7, wherein the pair of foot plates and the base support the plurality of cargo containers in a vertically stacked configuration.

9. The multi-function mobility device of claim 1 further comprising:

a camera configured to:
  authenticate a user; and
  based upon the authentication, notify one of the plurality of cargo containers of the authentication.

10. A cargo transporting system comprising:
a plurality of cargo containers; and
a multi-function mobility device comprising:
  a frame comprising:
    a pair of side rails; and
    a pair of foot plates attached to the pair of side rails, each of the pair of foot plates having a transport surface;
  a base removable from the pair of foot plates and having an upper surface and an opposite lower surface, the lower surface of the base including at least one receiving cavity that corresponds to a shape of the pair of foot plates,
  wherein the transport surface of the pair of foot plates is received in the at least one receiving cavity of the base, and the upper surface of the base is configured to support the plurality of cargo containers.

11. The cargo transporting system of claim 10, wherein the plurality of cargo containers further comprise:
  a display configured to provide information regarding an item inside at least one cargo container of the plurality of cargo containers.

12. The cargo transporting system of claim 10, wherein the plurality of cargo containers further comprise:
  a cargo transport interlocking system comprising:
    a plurality of receiving portions positioned within an upper surface of each of the plurality of cargo containers; and
    a plurality of corresponding elongated members that extend from a lower surface of each of the plurality of cargo containers,
  wherein each one of the plurality of corresponding elongated members are received in the corresponding plurality of receiving portions to interlock each of the plurality of cargo containers to vertically interlock the plurality of cargo containers.

13. The cargo transporting system of claim 12, wherein the upper surface of the base includes the plurality of receiving portions that receives the plurality of corresponding elongated members extending from the cargo container of the plurality of cargo containers in contact with the base.

14. The cargo transporting system of claim 12, wherein the plurality of cargo containers are stacked upon one another in a vertical direction.

15. The cargo transporting system of claim 14, wherein the plurality of cargo containers have a data or electrical connections.

16. The cargo transporting system of claim 15, wherein the base is a battery.

17. The cargo transporting system of claim 15, wherein the base is configured to provide data or electricity to a first cargo container of the plurality of cargo containers in direct contact with the base.

18. The cargo transporting system of claim 17, wherein the base is further configured to indirectly provide data or electricity to a second cargo container not in direct contact with the base by utilizing the first cargo container as a conduit to provide the data or electricity to the second cargo container.

19. The cargo transporting system of claim 11, wherein at least one cargo container of the plurality of cargo containers further comprises:
  an authentication device configured to:
    authenticate a user biometrically or with data provided by the user; and
    provide the user access to an item positioned within the at least one cargo container of the plurality of cargo containers based upon successful authentication of the user.

20. A cargo transporting system comprising:
a plurality of cargo containers comprising:
  an upper surface;
  an opposite lower surface, and
  a display configured to provide information regarding an item inside at least one cargo container of the plurality of cargo containers; and
  a cargo transport interlocking system comprising:
    a plurality of receiving portions positioned within the upper surface of each of the plurality of cargo containers; and
    a plurality of corresponding elongated members that extend from a lower surface of each of the plurality of cargo containers,
a multi-function mobility device comprising:
a frame comprising:
  a pair of side rails; and
  a pair of foot plates attached to the pair of side rails,
a base removable from the pair of foot plates and having an upper surface and an opposite lower surface,
wherein:
  the lower surface is in contact with the pair of foot plates and the upper surface of the base includes the plurality of receiving portions, and
  each one of the plurality of corresponding elongated members are received in the corresponding plurality of receiving portions to interlock each of the plurality of cargo containers to vertically interlock the plurality of cargo containers from the base.

* * * * *

UNITED STATES PATENT AND TRADEMARK OFFICE
CERTIFICATE OF CORRECTION

PATENT NO.         : 11,866,084 B2
APPLICATION NO.    : 17/091677
DATED              : January 9, 2024
INVENTOR(S)        : Douglas A. Moore, Paul Nichols and Thomas Mitchell Dair It is certified that error appears in the above-identified patent and that said Letters Patent is hereby corrected as shown below:

In the Claims

In Column 18, Line(s) 66, Claim 9, after "Claim 1", insert --,--.

Signed and Sealed this
Sixteenth Day of April, 2024

Katherine Kelly Vidal
*Director of the United States Patent and Trademark Office*